United States Patent
Lee et al.

(10) Patent No.: US 9,501,053 B2
(45) Date of Patent: Nov. 22, 2016

(54) GOAL-ORIENTED NUMERICAL CONTROL AUTOMATIC TUNING SYSTEM AND METHOD

(71) Applicant: INDUSTRIAL TECHNOLOGY RESEARCH INSTITUTE-LON, Hsinchu (TW)

(72) Inventors: Chien-Yi Lee, Hsinchu (TW); Hung-Chieh Hsieh, Hsinchu (TW); Cheng-Yu Chen, Hsinchu (TW); Hao-Wei Nien, Hsinchu (TW); Yi-Ying Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 664 days.

(21) Appl. No.: 13/897,098

(22) Filed: May 17, 2013

(65) Prior Publication Data

US 2014/0129024 A1    May 8, 2014

(30) Foreign Application Priority Data

Nov. 2, 2012   (TW) .............................. 101140674 A

(51) Int. Cl.
  *G05B 13/02*    (2006.01)
  *G05B 19/404*   (2006.01)

(52) U.S. Cl.
  CPC ... *G05B 19/404* (2013.01); *G05B 2219/49181* (2013.01)

(58) Field of Classification Search
  CPC .. G05B 13/048; G05B 13/04; G05B 13/042; G05B 13/024; G05B 2219/32297; G06F 17/10
  See application file for complete search history.

(56) References Cited

U.S. PATENT DOCUMENTS 5,157,597 A    10/1992   Iwashita
5,268,835 A *  12/1993   Miyagaki ........... G05B 13/0285
                                                       700/31

(Continued)

FOREIGN PATENT DOCUMENTS

CN    1206880 A     2/1999
CN    101895252 A   11/2010

(Continued)

OTHER PUBLICATIONS

Soshin et al., "High Performance Sensorless Induction Motor Drive Incorporating Vector Controlled Scheme PWM Inverter-Fed with Auto-Tuning Machine Parameter Estimation", Power Electronics and Drive Systems, 2003. PEDS 2003. The Fifth International Conference on, vol. 2, pp. 1268-1273, Nov. 17-20, 2003.

(Continued)

*Primary Examiner* — Darrin Dunn
(74) *Attorney, Agent, or Firm* — Rabin & Berdo, P.C.

(57) ABSTRACT

A goal-oriented numerical control automatic tuning system is used for a numerical controller of a machine tool to automatically tune the machine tool. The system includes a goal-oriented input module for receiving external goal values; a machining test path selecting module for receiving an external machining path; and an automatic machine-tuning equation module including a control equation with a predetermined equation coefficient for receiving the goal values and the machining path from the goal-oriented input module and the machining test path selecting module, respectively, such that an appropriate control parameter can be obtained by calculating the control equation based on the goal values and the machining path, and then this control parameter passed to a numerical controller in order to control actuation of the machine tool.

11 Claims, 6 Drawing Sheets

(56) References Cited

U.S. PATENT DOCUMENTS

| | | | | |
|---|---|---|---|---|
| 5,285,378 | A * | 2/1994 | Matsumoto | G05B 19/414 700/173 |
| 5,394,322 | A * | 2/1995 | Hansen | G05B 13/045 700/32 |
| 5,847,952 | A * | 12/1998 | Samad | G05B 13/027 700/37 |
| 6,198,246 | B1 * | 3/2001 | Yutkowitz | G05B 11/42 318/561 |
| 6,445,961 | B1 * | 9/2002 | Melvin | G05B 11/36 318/561 |
| 6,510,353 | B1 * | 1/2003 | Gudaz | G05B 19/0428 700/37 |
| 6,546,295 | B1 * | 4/2003 | Pyotsia | G05B 13/024 318/561 |
| 6,806,674 | B2 | 10/2004 | Iwashita et al. | |
| 6,961,628 | B2 | 11/2005 | Yutkowitz | |
| 7,937,165 | B2 * | 5/2011 | Moden | G05B 13/048 324/307 |
| 2004/0230325 | A1 * | 11/2004 | Ramamoorthy | G05B 13/042 700/37 |
| 2008/0027704 | A1 * | 1/2008 | Kephart | G05B 19/41885 703/22 |
| 2008/0065257 | A1 * | 3/2008 | He | B23Q 17/09 700/175 |
| 2012/0107993 | A1 * | 5/2012 | Karlin | B81C 1/00801 438/50 |
| 2012/0187890 | A1 | 7/2012 | Otsuki et al. | |

FOREIGN PATENT DOCUMENTS

| | | |
|---|---|---|
| CN | 101960398 A | 1/2011 |
| CN | 102789193 A | 11/2012 |
| TW | 200848199 A | 12/2008 |
| TW | M395532 U1 | 1/2011 |

OTHER PUBLICATIONS

Wang et al., "Development of an intelligent auto-tuning controller for precision machining", Advanced Materials Research, Advances in Materials and Processing Technologies II, vol. 264-265, pp. 1293-1299, 2011, Jun. 30, 2011.

Chen et al., "Auto-tuning digital control based on parameters identification and disturbance observer", Materials Science Forum, Progress on Advanced Manufacture for Micro/Nano Technology, vol. 505-507, pp. 529-534, Jan. 15, 2006.

Bose et al., "Technology trends in microcomputer control of electrical machines", IEEE transactions on Industrial Electronics, vol. 35, No. 1, pp. 160-177, Feb. 1988.

China Patent Office, Office Action issued on Dec. 31, 2015.

Na et al., "Contour error analysis and gain tuning for CNC machining center", The 4th International Workshop on Advanced Motion Control, Mar. 1996, pp. 197-202.

Suebsomran et al.,"Optimal Parameter Calibration of the self-made Lathe CNC machine", The 9th Global Congress on Manufacturing and Management (GCMM 2008), Nov. 2008, pp. 1-4.

* cited by examiner

GOAL-ORIENTED NUMERICAL CONTROL AUTOMATIC TUNING SYSTEM AND METHOD

CROSS-REFERENCE TO RELATED APPLICATIONS

This application claims priority to Taiwanese Patent Application No. 101140674, filed on Nov. 2, 2012. The entirety of the above-mentioned patent application is hereby incorporated by reference herein and made a part of this specification.

TECHNICAL FIELD

The present disclosure relates to tuning systems and methods applied to machine tools, and more particularly, to a goal-oriented numerical control automatic tuning system and method.

BACKGROUND

Machine tools play an important role in the processing field. With the evolution of technology, new machine tools have high speed, high feed rate and high precision. In order to achieve the requirements for processing with high speed and high precision, it is essential to improve control techniques.

As for contour movements in multi-axis machine tools, servo control for each of the axes may not match one another due to different loadings thereon, resulting in increased tracking error and contour error. Therefore, the machine tool generally needs to be tuned for maximum effectiveness.

A traditional approach for adjusting a control parameter is commonly based on the trial and error method. However, the trial and error method is not only time consuming and costly, but also lacks a set of intuitive and systematic procedures. Such method also requires users to have expertise in automatic control, servo principle and mechanical principle, and desired results can only obtained through experiences accumulated over a long time. In addition, most of the parameter adjustments are limited in dedicated servo drives, so that the machining precision and control of the machine tools cannot be effectively enhanced.

Therefore, there is a need to develop a tuning system that enables automatic tuning of parameters without experienced technicians as required in the traditional method for adjusting parameters.

SUMMARY

The present disclosure provides a goal-oriented numerical control automatic tuning system for a numerical controller of a machine tool to automatically tune the machine tool. The system may include: a goal-oriented input module for receiving goal values externally inputted; a machining test path selecting module for receiving a machining path externally inputted; and an automatic machine-tuning equation module including a control equation with a predetermined equation coefficient for receiving the goal values and the machining path from the goal-oriented input module and the machining test path selecting module, respectively, such that an appropriate control parameter is calculated from the control equation based on the goal values and the machining path, and then the control parameter is passed to a numerical controller in order to control actuation of a machine tool.

The present disclosure further provides an automatic tuning method applied to the above goal-oriented numerical control automatic tuning system. The method may include: (1) externally inputting goal values to a goal-oriented input module and an external machining path to a machining test path selecting module; (2) receiving the goal values and the machining path from the goal-oriented input module and the machining test path selecting module, respectively, by an automatic machine-tuning equation module including a control equation with a predetermined equation coefficient such that an appropriate control parameter is calculated from the control equation based on the goal values and the machining path, and then the control parameter is passed to a numerical controller in order to control actuation of a machine tool; and (3) determining if the difference between an actual result after actuation of the machine tool and a result of simulated actuation using the control parameter satisfy the goal values and the machining path, if so, then completing automatic tuning of the machine tool; if not, returning to step (2) to recalculate the control equation in order to minimize the difference between the actual result after actuation and the result of simulated actuation, and repeating step (3).

Compared to the prior art, the goal-oriented numerical control automatic tuning system of the present disclosure allows users to input more intuitive goal values such as a machining precision or an allowable error range, and the machine tool is then automatically tuned using the pre-established control equation. In addition, the automatic tuning of the machine tool is performed through a digital (numerical) controller without being limited by dedicated servo drives, thereby allowing the machine tool to achieve high-speed and high-precision machining performance.

BRIEF DESCRIPTION OF THE DRAWINGS

The present disclosure can be more fully understood by reading the following detailed description of the preferred embodiments, with reference made to the accompanying drawings, wherein.

DETAILED DESCRIPTION

The present disclosure is described by the following specific embodiments. Those with ordinary skills in the arts can readily understand the other advantages and functions of the present disclosure after reading this specification.

Figure 1A:
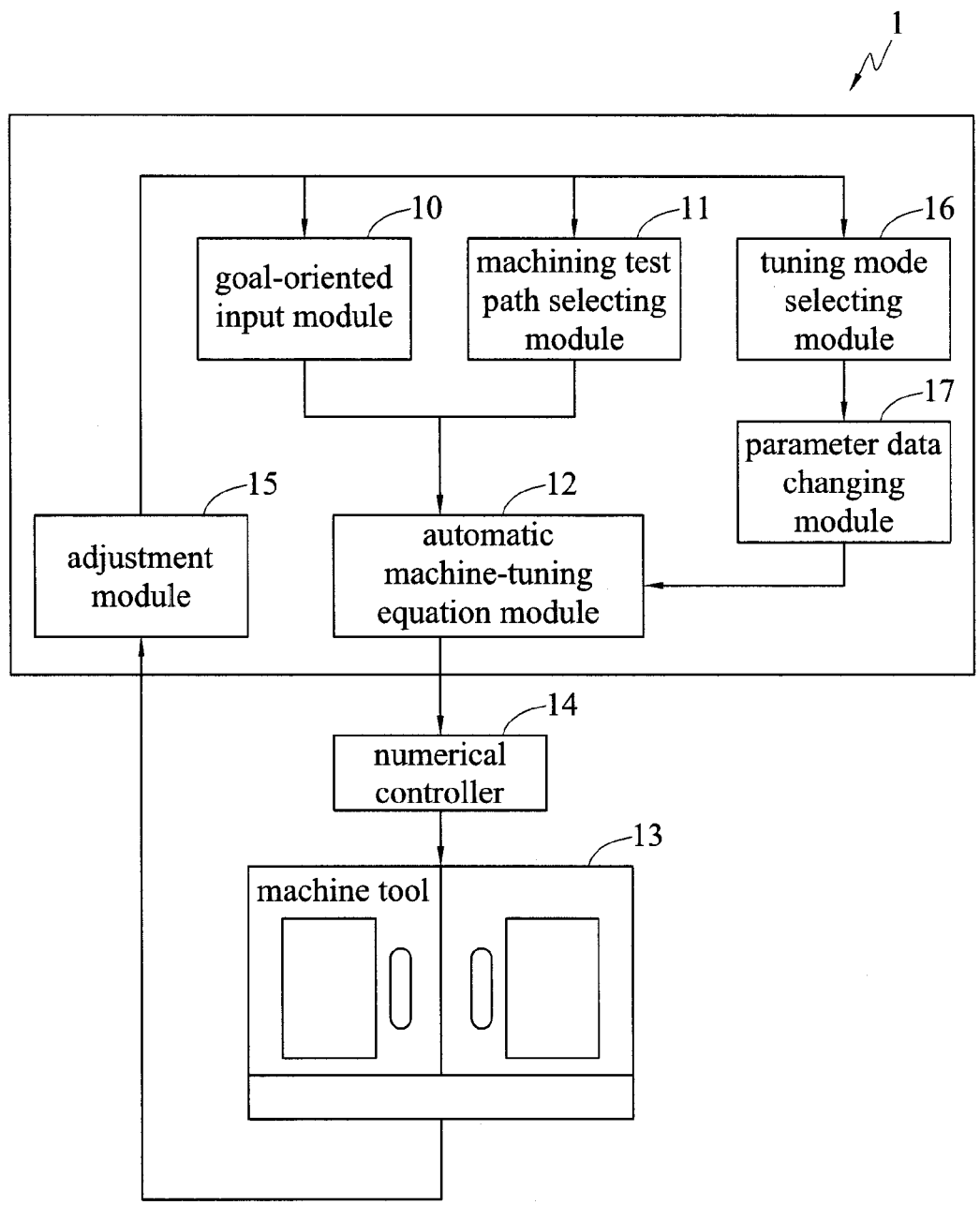
FIG. 1A is a schematic diagram illustrating a goal-oriented numerical control automatic tuning system 1 in accordance with an embodiment of the present disclosure.

FIG. 1A is a schematic diagram illustrating a goal-oriented numerical control automatic tuning system 1 in accordance with an embodiment of the present disclosure. As shown, the goal-oriented numerical control automatic tuning system 1 of the present disclosure is applied to a numerical controller 14 of a machine tool 13 for automatically tuning the machine tool 13. The system mainly includes a goal-oriented input module 10, a machining test path selecting module 11, and an automatic machine-tuning equation module 12.

The goal-oriented input module 10 is used for receiving goal values inputted from the outside (such as users). In an embodiment, the goal values include a machining precision and an allowable error range.

Figure 1B:
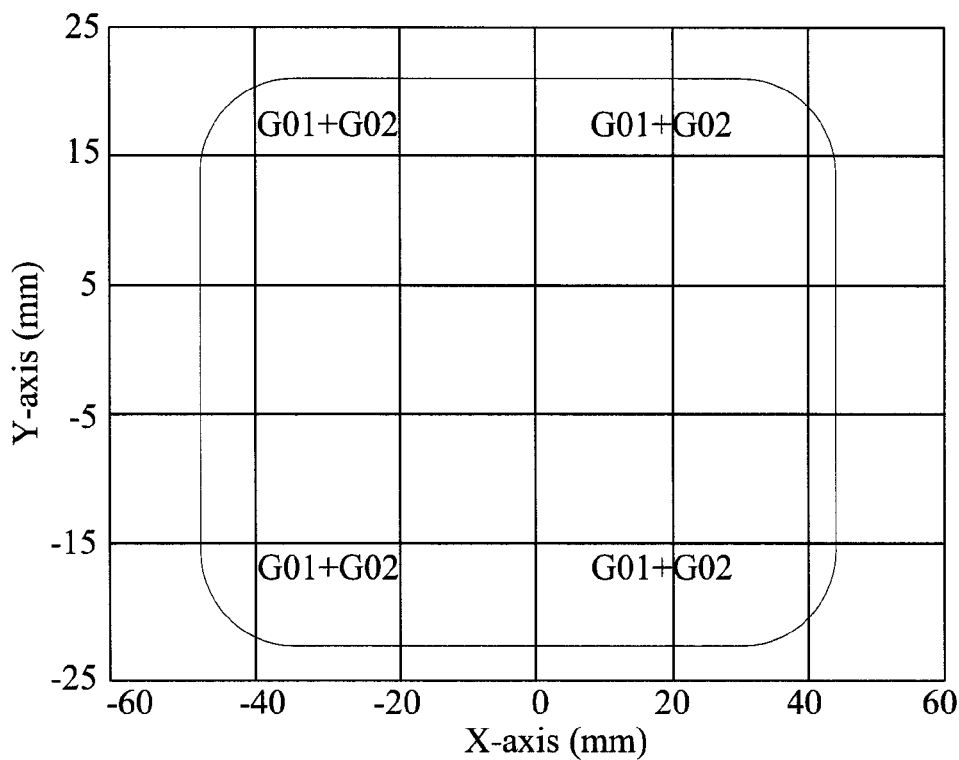
FIG. 1B is a schematic diagram illustrating a fixed machining path in the prior art.
Figure 1C:
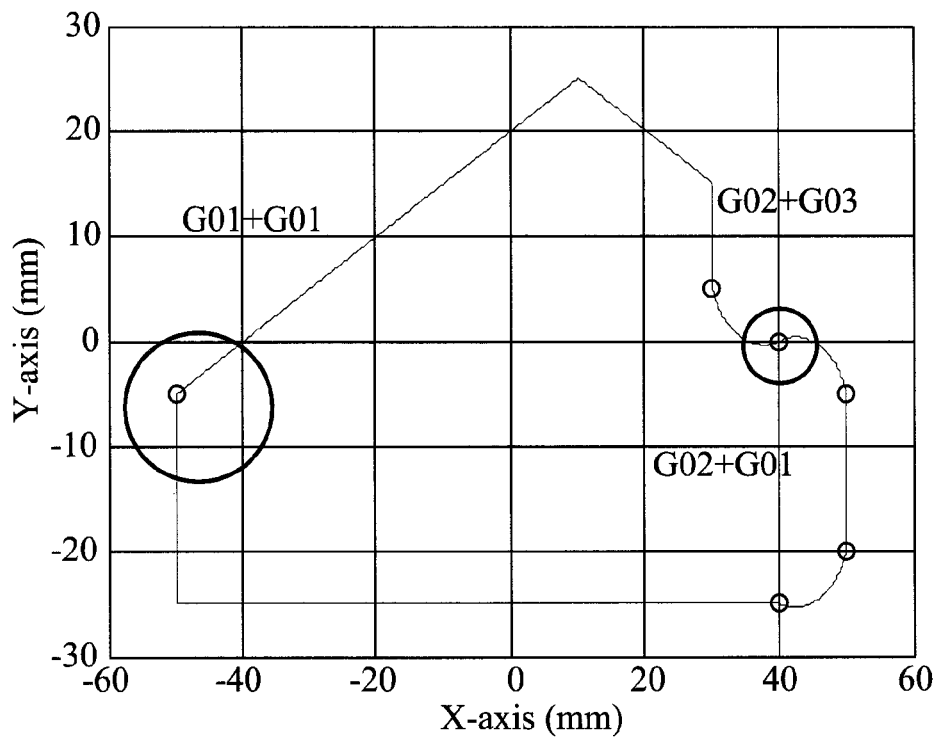
FIG. 1C is a schematic diagram illustrating an arbitrary machining path of a goal-oriented numerical control automatic tuning system of the present disclosure.

The machining test path selecting module 11 is used for receiving a machining path inputted from the outside (e.g. the users). In the prior art, the machining path for tuning is a fixed path, which is usually a fixed square contour composed of only linear interpolations (G01) and clockwise circular interpolations (G02) (as shown in FIG. 1B), but the machining test path selecting module 11 of the present disclosure provides the users with a combination of linear interpolations (G01), clockwise circular interpolations (G02) and counterclockwise circular interpolations (G03), thereby obtaining arbitrary machining paths that can be composed of straight lines, angles, arcs, or combinations thereof, such as that shown in FIG. 1C. Thus, in the present disclosure, the result of tuning is more in line with the contour of the object to be processed.

The automatic machine-tuning equation module 12 includes a control equation with a predetermined equation coefficient. The automatic machine-tuning equation module 12 receives the goal values and the machining path from the goal-oriented input module 10 and the machining test path selecting module 11, respectively, so that the an appropriate control parameter can be obtained from calculation of the control equation based on the goal values and the machining path, and then this control parameter is passed to the numerical controller 14 in order to control the actuation of the machine tool 13.

In one implementation aspect, the goal-oriented numerical control automatic tuning system 1 further includes an adjustment module 15 for comparing the difference between an actual result after actuation of the machine tool 13 and a result of simulated actuation using the control parameter. This difference is used as the basis for adjusting the control parameter. An updated control parameter can be generated by adjusting the goal values via the goal-oriented input module 10 or by adjusting the machining path via the machining test path selecting module 11. As such, the machine tool 13 can then be controlled to actuate according to the updated control parameter. The actual result after actuation can be positions of a machining path during a test run or an actual run of the machine tool 13 measured by a measuring device such as an encoder, an optical ruler or a grid encoder. The result of simulated actuation can be theoretical positions of a machining path of the machine tool 13 simulated and calculated based on the control parameter. In one implementation aspect, the difference between the actual result after actuation of the machine tool 13 and the result of simulated actuation based on the control parameter indicates the actual error in precision, which is the position of a machining path during a test run or an actual run of the machine tool 13 minus the theoretical position of a machining path of the machine tool 13 simulated and calculated based on the control parameter. In another embodiment, the goal-oriented numerical control automatic tuning system 1 of the present disclosure further includes a tuning mode selecting module 16 and a parameter data changing module 17, wherein the tuning mode selecting module 16 is used for setting the goal-oriented numerical control automatic tuning system 1 in an automatic tuning mode, a semi-automatic tuning mode or a manual tuning mode, and the parameter data changing module 17 is used for generating an updated control parameter under the automatic tuning mode; selecting one of a plurality of equation coefficients to generate an updated control parameter under the semi-automatic tuning mode; or inputting a manual control parameter under the manual tuning mode, and then outputting the resulting control parameter to the automatic machine-tuning equation module 12 so as to control the actuation of the machine tool 13 according to the updated control parameter or the manual control parameter.

The above plurality of equation coefficients correspond to different levels of machining precision and different periods of machining time, respectively. For example, an equation coefficient with the highest machining precision and the longest machining time is defined as E1, while an equation coefficient with the lowest machining precision and the shortest machining time is defined as E10.

Figure 2A:
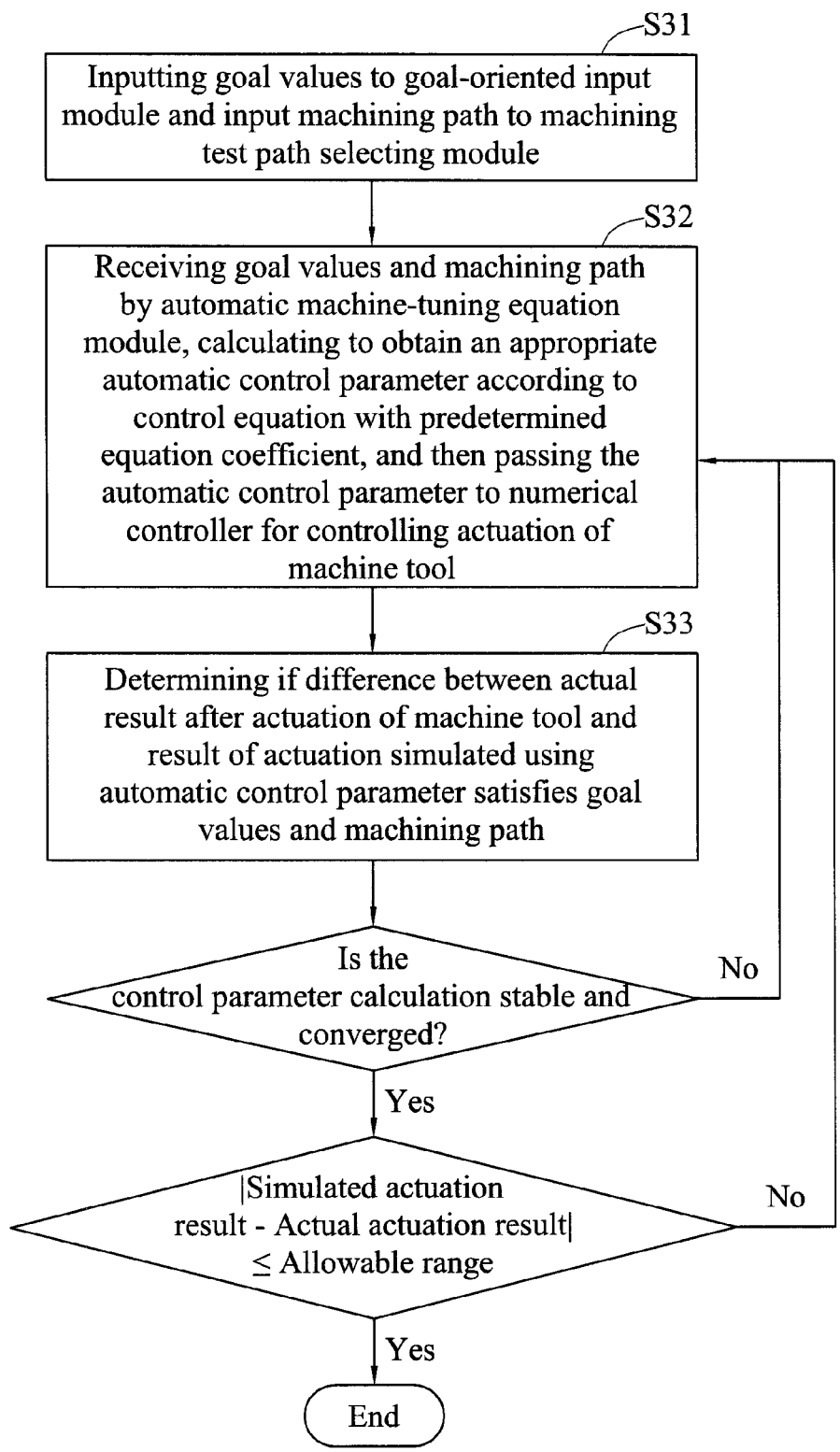
FIGS. 2A to 2D are flowcharts illustrating an automatic tuning method applied to an embodiment of the goal-oriented numerical control automatic tuning system of the present disclosure.

FIG. 2A is a flowchart illustrating an automatic tuning method applied to an embodiment of the goal-oriented numerical control automatic tuning system of the present disclosure such as the one described above. As shown, the automatic tuning method of the present disclosure includes steps S31 to S33, which are described in details below.

In step S31, goal values are inputted to the goal-oriented input module 10 and a machining path is inputted to the machining test path selecting module 11 from outside. In an embodiment, the goal values include a machining precision and an allowable error range.

In step S32, the goal values and the machining path are received by the automatic machine-tuning equation module 12 from the goal-oriented input module 10 and the machining test path selecting module 11, respectively, so that an appropriate control parameter can be obtained by calculating a control equation with a predetermined equation coefficient based on the goal values and the machining path, and this control parameter is then passed to the numerical controller 14 for controlling the actuation of the machine tool 13.

In step S33, it is determined whether the difference between an actual result after actuation of the machine tool 13 and a result of simulated actuation using the control parameter satisfies the expected goal values and the machining path. If so, then the automatic tuning of the machine tool 13 is completed; if not, return to step S32 to recalculate to obtain a control parameter, so as to minimize the difference between the actual result after actuation and the result of simulated actuation, and repeat step S33.

In this embodiment, the control equation can be represented by the following equation (1):

$$\text{Err} = \Sigma_1^n C_n \Sigma_1^n F_n \qquad (1)$$

wherein Err indicates an error caused by the difference between the actual result after actuation of the machine tool 13 and the result of simulated actuation using the control parameter, $C_n$ represents an equation coefficient, and $F_n$ represents a control parameter. Before automatic tuning is performed, a plurality of experimental control parameters $F_n$ are inputted based on an experimental method such as Taguchi methods, and then the difference between an actual result after actuation of the machine tool 13 and a result of simulated actuation using the experimental control parameter is determined and used as the basis for solving the control equation in reverse in order to obtain an equation coefficient that best suited to the mechanical characteristics of the machine tool 13.

Figure 2B:
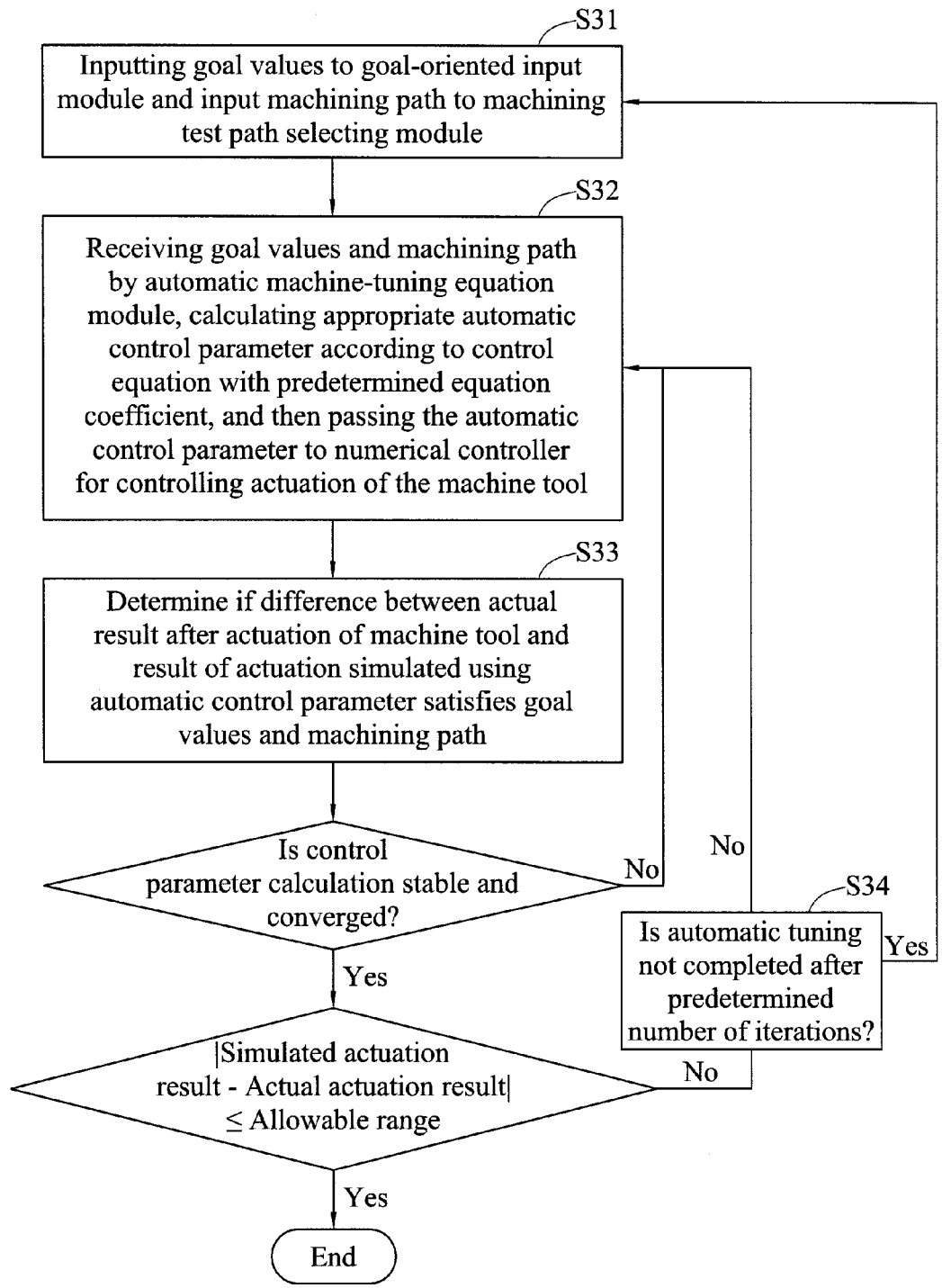

In an embodiment, as shown in FIG. 2B, the automatic tuning method of the present disclosure further includes step S34, in which if automatic tuning is not completed after a predetermined number of iterations, then altering of the goal values and the machining path is requested.

Figure 2C:
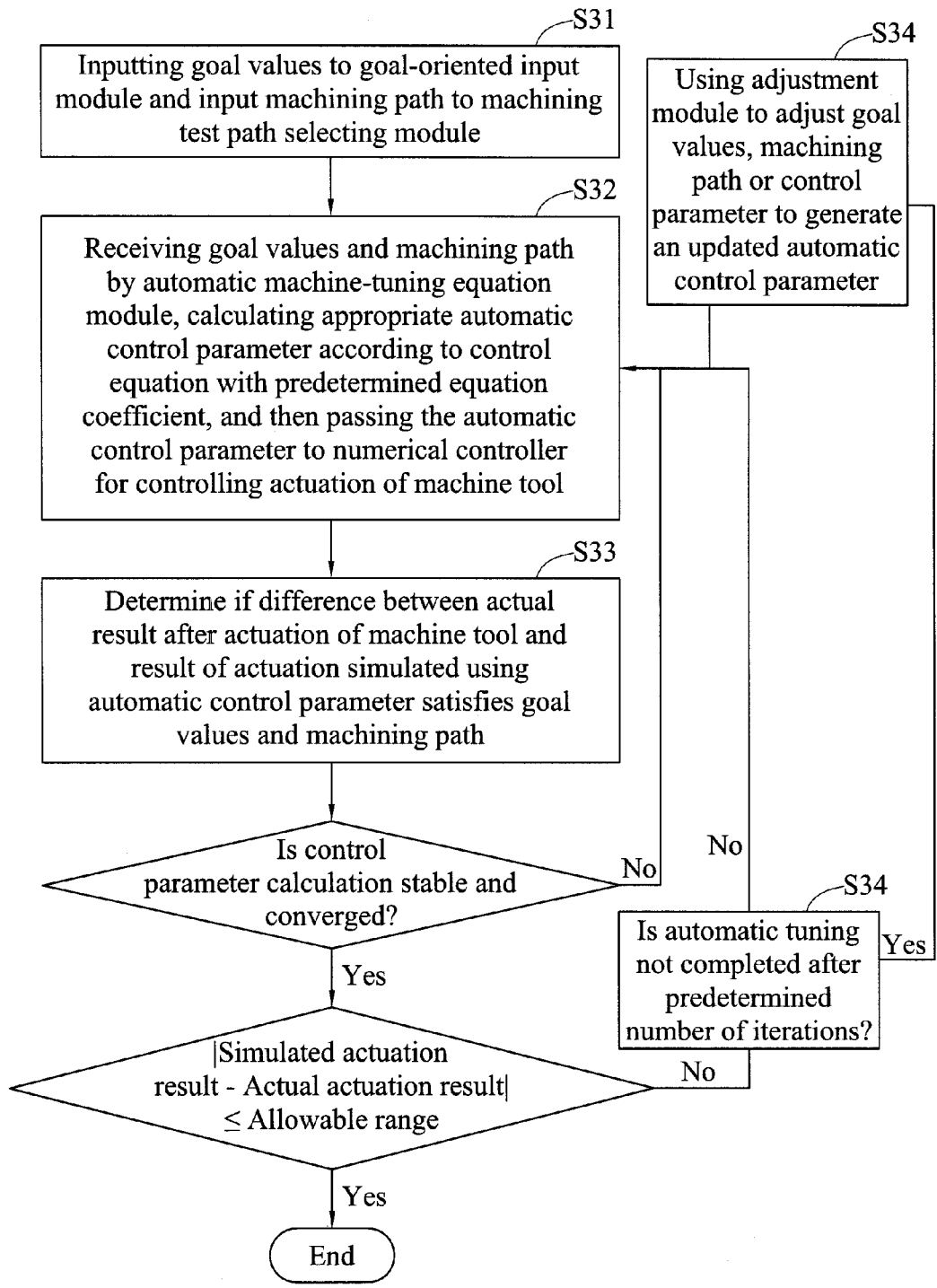

In another embodiment, as shown in FIG. 2C, step S34 further includes retrieving the difference between the actual result after actuation of the machine tool 13 and the result of simulated actuation using the control parameter by the adjustment module 15 if automatic tuning is not completed after a predetermined number of iterations, using the difference as the basis for adjusting the control parameter, then generating an updated control parameter by adjusting the goal values via the goal-oriented input module 10 or by adjusting the machining path via the machining test path selecting module 11, and passing the updated control parameter to the numerical controller 14 in order to control the actuation of the machine tool 13 based on the updated control parameter.

Figure 2D:
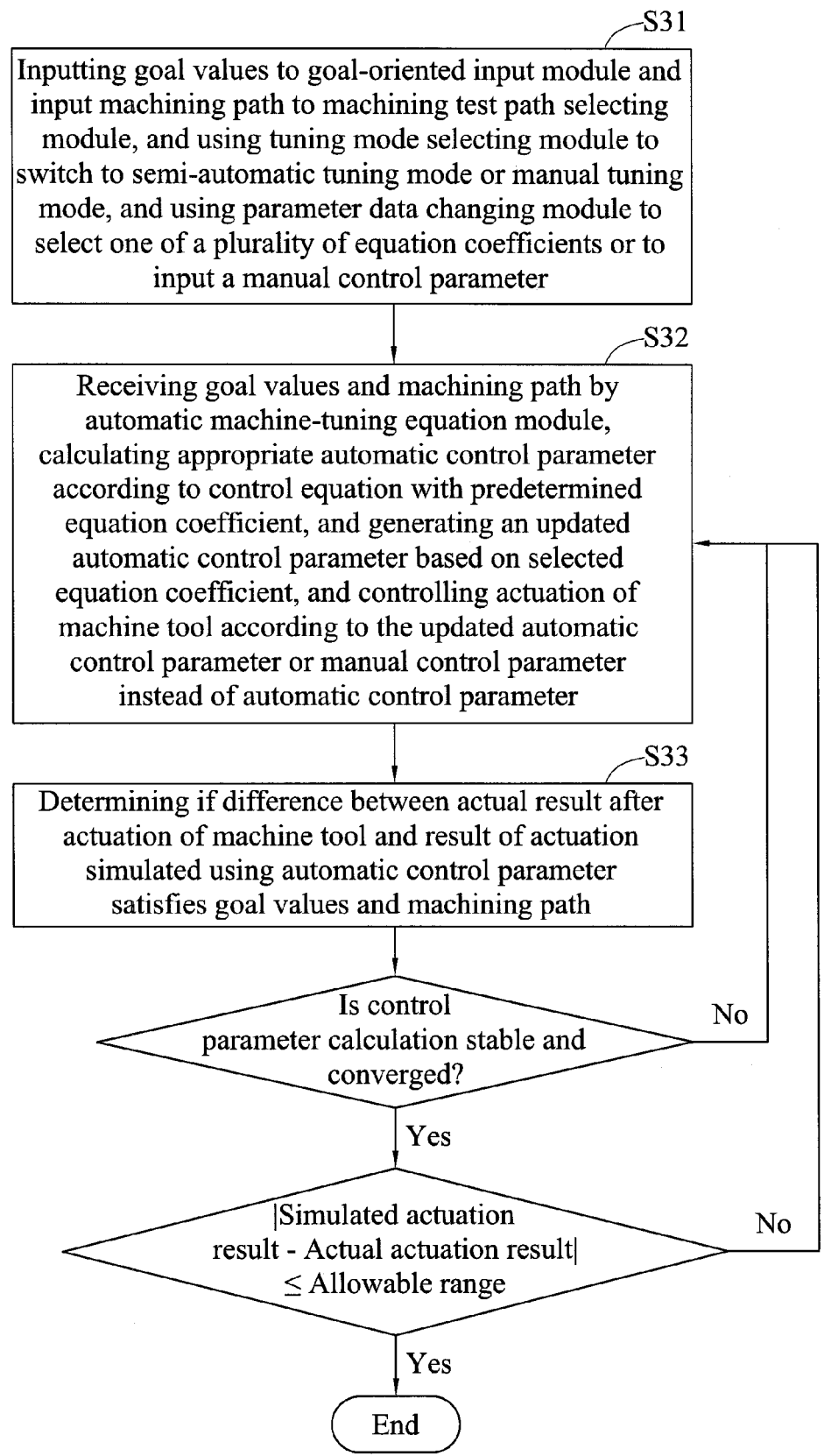

In yet another embodiment, as shown in FIG. 2D, step S31 further includes using the tuning mode selecting module 16 to switch to a semi-automatic tuning mode or a manual tuning mode, so that the parameter data changing module 17 is used for selecting one of a plurality of equation coefficients under the semi-automatic tuning mode or that the parameter data changing module 17 is used for inputting a manual control parameter under the manual tuning mode. Step S32 further includes the automatic machine-tuning equation module 12 generating an updated control parameter based on the selected equation coefficient, and controlling the actuation of the machine tool 13 using the updated control parameter or the manual control parameter instead of the control parameter.

In summary, the goal-oriented numerical control automatic tuning system of the present disclosure is combined with the digital controller of a machine tool to allow the users to input more intuitive goal values such as a machining precision or an allowable error range, and the machine tool is then automatically tuned using the pre-established control equation. In addition, the goal-oriented numerical control automatic tuning system of the present disclosure performs automatic tuning of the machine tool through the digital controller, the control parameter is not limited by dedicated servo drives, and the machining performance of the machine tool can thus be maximized.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A goal-oriented numerical control automatic tuning system applied to a numerical controller of a machine tool for automatically tuning the machine tool, comprising:
   a hardware processor implementing a goal-oriented input module, a machining test path selecting module, an automatic machine-tuning equation module and an adjustment module, wherein:
   the goal-oriented input module receives goal values inputted externally;
   the machining test path selecting module receives a machining path inputted externally;
   the automatic machine-tuning equation module includes a control equation with a predetermined equation coefficient for receiving the goal values and the machining path from the goal-oriented input module and the machining test path selecting module, respectively, such that an appropriate control parameter is calculated using the control equation based on the goal values and the machining path, and the control parameter is passed to the numerical controller in order to control actuation of the machine tool; and
   the adjustment module compares the difference between an actual result after actuation of the machine tool and a result of simulated actuation using the control parameter, and generates an updated control parameter based on the difference by adjusting the goal values via the goal-oriented input module or by adjusting the machining path via the machining test path selecting module in order to control the actuation of the machine tool.

2. The goal-oriented numerical control automatic tuning system of claim 1, further comprising:
   a tuning mode selecting module implemented by the hardware processor for setting the goal-oriented numerical control automatic tuning system in an automatic tuning mode, a semi-automatic tuning mode or a manual tuning mode; and
   a parameter data changing module implemented by the hardware processor for
      under the automatic tuning mode, making the automatic machine-tuning equation module to generate an updated control parameter based on the difference determined by the adjustment module by adjusting the goal values via the goal-oriented input module or by adjusting the machining path via the machining test path selecting module in order to control the actuation of the machine tool;
      under the semi-automatic tuning mode, selecting one of a plurality of equation coefficients to generate and output an updated control parameter to the automatic machine-tuning equation module in order to control the actuation of the machine tool; or
      under the manual tuning mode, inputting a manual control parameter to generate and output an updated control parameter to the automatic machine-tuning equation module in order to control the actuation of the machine tool.

3. The goal-oriented numerical control automatic tuning system of claim 2, wherein the plurality of equation coefficients respectively correspond to different levels of machining precision and different periods of machining time.

4. The goal-oriented numerical control automatic tuning system of claim 1, wherein the goal values include a machining precision and an allowable error range.

5. The goal-oriented numerical control automatic tuning system of claim 1, wherein the machining path is an arbitrary machining path including at least one of a straight line, an angle, an arc, and a combination thereof.

6. A goal-oriented numerical control automatic tuning method, comprising the following steps of:
   (1) externally inputting goal values to a goal-oriented input module and externally inputting an external machining path to a machining test path selecting module;
   (2) receiving the goal values and the machining path from the goal-oriented input module and the machining test path selecting module, respectively, by an automatic machine-tuning equation module including a control equation with a predetermined equation coefficient, calculating the control equation to obtain a control parameter based on the goal values and the machining path, and then passing the control parameter to a numerical controller in order to control actuation of a machine tool;

(3) determining if the difference between an actual result after actuation of the machine tool and a result of simulated actuation using the control parameter satisfy the goal values and the machining path, if so, then completing automatic tuning of the machine tool; if not, returning to step (2) to recalculate the control equation in order to minimize the difference between the actual result after actuation and the result of simulated actuation, and repeating step (3); and (4) retrieving the difference between the actual result after actuation of the machine tool and the result of simulated actuation using the control parameter by an adjustment module if automatic tuning is not achieved after a predetermined number of iterations, then generating an updated control parameter based on the difference by adjusting the goal values via the goal-oriented input module or by adjusting the machining path via the machining test path selecting module, and passing the updated control parameter to the numerical controller in order to control the actuation of the machine tool based on the updated control parameter.

7. The goal-oriented numerical control automatic tuning method of claim 6, wherein step (1) further includes: switching to a semi-automatic tuning mode or a manual tuning mode using a tuning mode selecting module, so that a parameter data changing module selects one of a plurality of equation coefficients under the semi-automatic tuning mode or inputs a manual control parameter under the manual tuning mode, and step (2) further includes: generating an updated control parameter by the automatic machine-tuning equation module based on a selected equation coefficient, and then controlling the actuation of the machine tool using the updated control parameter or the manual control parameter instead of the control parameter.

8. The goal-oriented numerical control automatic tuning method of claim 6, wherein the predetermined equation coefficient is obtained by inputting a plurality of experimental control parameters based on an experimental method and solving the control equation in reverse based the difference between an actual result after actuation of the machine tool and a result of simulated actuation using the experimental control parameter.

9. The goal-oriented numerical control automatic tuning method of claim 8, wherein the experimental method is Taguchi method.

10. The goal-oriented numerical control automatic tuning method of claim 6, wherein the goal values include a machining precision and an allowable error range.

11. The goal-oriented numerical control automatic tuning method of claim 6, wherein the machining path is an arbitrary machining path including at least one of a straight line, an angle, an arc, and a combination thereof.

* * * * *

UNITED STATES PATENT AND TRADEMARK OFFICE
CERTIFICATE OF CORRECTION

| | | |
|---|---|---|
| PATENT NO. | : 9,501,053 B2 | Page 1 of 1 |
| APPLICATION NO. | : 13/897098 | |
| DATED | : November 22, 2016 | |
| INVENTOR(S) | : Chien-Yi Lee et al. | |

It is certified that error appears in the above-identified patent and that said Letters Patent is hereby corrected as shown below:

On the Title Page

Item (71) Applicant should read:
INDUSTRIAL TECHNOLOGY RESEARCH INSTITUTE, Hsinchu (TW)

Signed and Sealed this
Fourth Day of July, 2017

Joseph Matal
*Performing the Functions and Duties of the*
*Under Secretary of Commerce for Intellectual Property and*
*Director of the United States Patent and Trademark Office*